Figure 1:
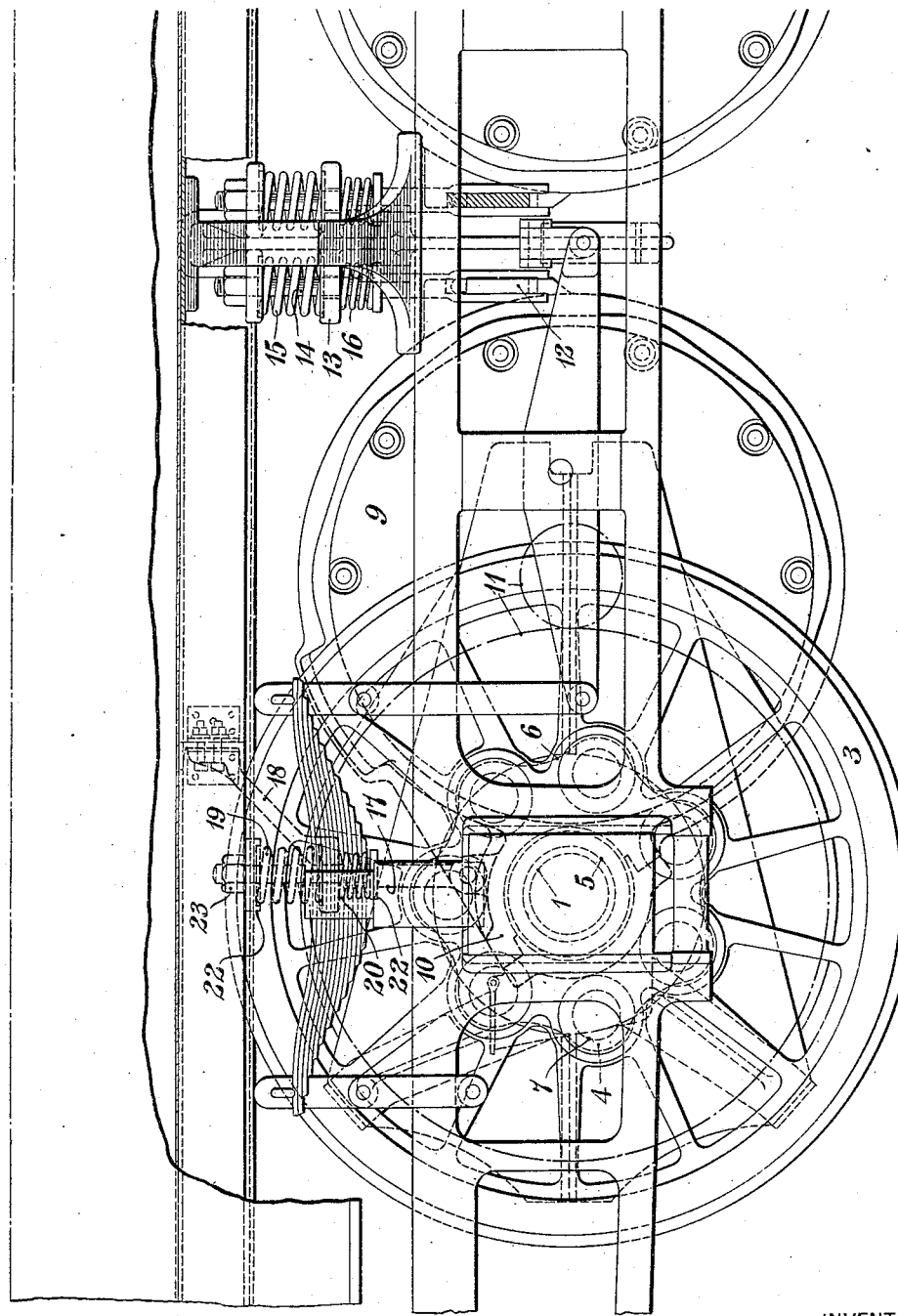

N. W. STORER.
SUSPENSION MEANS FOR RAILWAY MOTORS.
APPLICATION FILED JAN. 10, 1908.

934,473.

Patented Sept. 21, 1909.
2 SHEETS—SHEET 1.

WITNESSES:
C. L. Belcher
Otto S. Schairer

INVENTOR
Norman W. Storer
BY
Wiley G. Carr
ATTORNEY

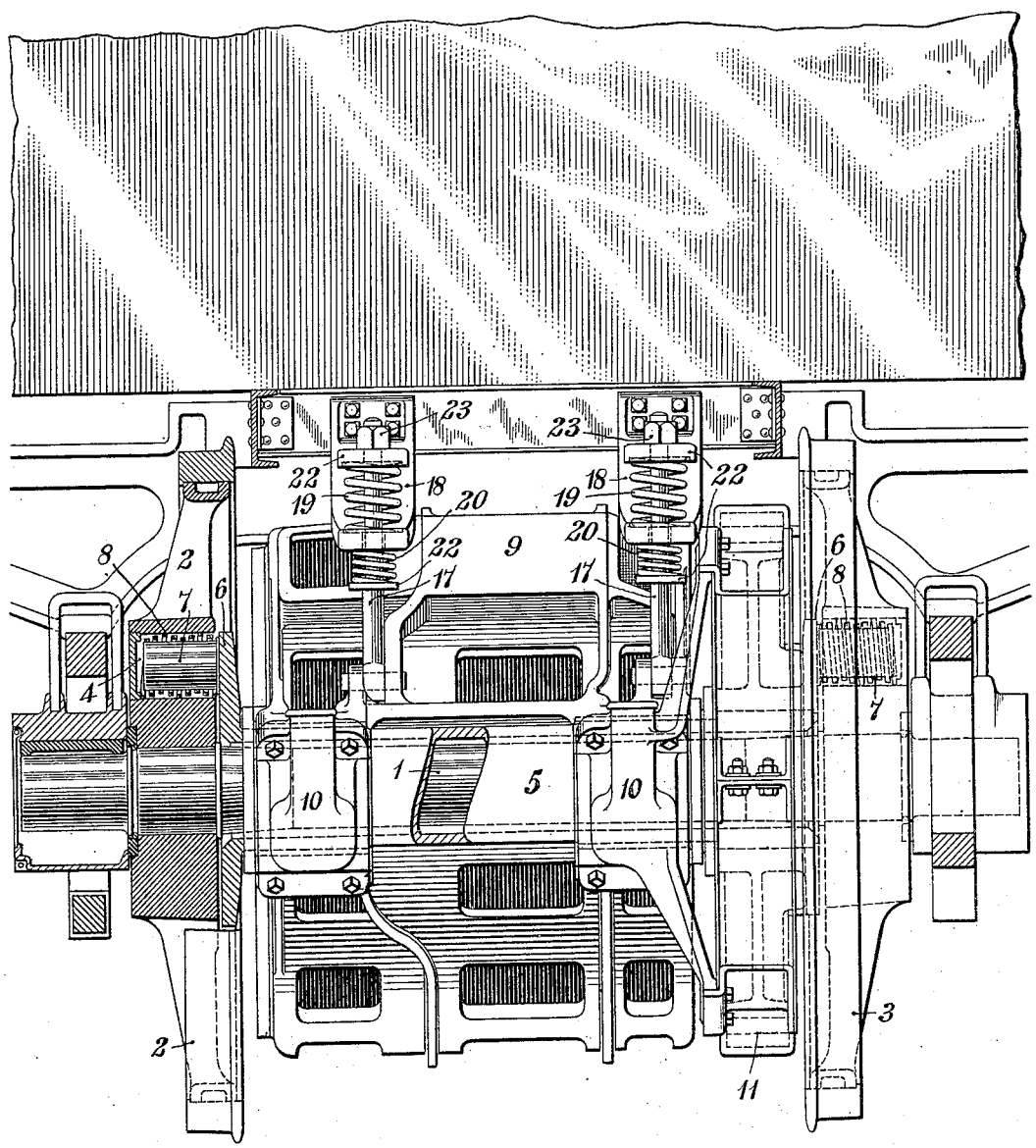

UNITED STATES PATENT OFFICE.

NORMAN W. STORER, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

SUSPENSION MEANS FOR RAILWAY-MOTORS.

934,473.

Specification of Letters Patent. Patented Sept. 21, 1909.

Application filed January 10, 1908. Serial No. 410,213.

*To all whom it may concern:*

Be it known that I, NORMAN W. STORER, a citizen of the United States, and a resident of Pittsburg, in the county of Allegheny and State of Pennsylvania, have invented a new and useful Improvement in Suspension Means for Railway-Motors, of which the following is a specification.

My invention relates to railway motors, and particularly to supporting means therefor.

The object of my invention is to provide means for so supporting a motor that but comparatively little or none of its weight will be borne by the bearings, whereby the motor is maintained in a definite position with respect to the parts driven thereby.

It has heretofore been proposed to surround the driving axle of a railway vehicle with a quill and resiliently connect it to the driving wheels, and to gear the propelling motor to a quill, as well as to provide it, at one side, with bearings upon the quill. A resilient speed-changing connection is thus afforded between the motor and the driving wheels, and by providing the usual resilient supporting means upon the side of the motor opposite the bearing upon the quill, the motor may be resiliently supported, as a whole. The motors are also more commonly geared directly to the driving axles and are provided at one side with bearings thereon. When very large and heavy motors are employed in these arrangements, however, it is necessary to provide large and expensive bearings for the motors upon the quills or axles in order that they may bear the weight placed upon them without overheating and undue wear and strain.

According to the present arrangement, the bearings of the motor upon the quill or axle may be relieved, to any desired degree, of the weight of the motor, and they may, therefore, be of only sufficient size to afford means for maintaining the motor in fixed relation with respect to the quill or axle while permitting rotation thereof.

Figure 1 of the accompanying drawings is a view, in side elevation, of a portion of a locomotive constructed in accordance with my invention, some of the parts being broken away for the sake of clearness of illustration, and Fig. 2 is a view, in end elevation, of the locomotive.

An axle 1 of the locomotive is provided at its ends with driving wheels 2 and 3 having sets of annularly-arranged chambers 4, and is loosely surrounded by a quill 5 having annular flanges or radial arms 6 at its ends, and bosses 7 that project therefrom into the wheel chambers 4. The bosses 7 are surrounded within the wheel chambers by suitable resilient means, such as specially formed helical springs 8, adjacent convolutions of which are eccentrically disposed, such a spring forming the subject-matter of Patent No. 817,133, granted to the Westinghouse Electric & Manufacturing Company, as assignee of Robert Siegfried.

An electric motor 9 for propelling the vehicle is provided at one side with bearings 10 that surround and engage the quill 5, the rotatable member of the motor being operatively connected to the quill by means of speed-reducing gearing 11. The side of the motor opposite the bearings 10 is secured to a cross-bar 12 that is resiliently suspended from a stationary bracket 13 by means of a forked rod 14 and helical compression springs 15 and 16 disposed, respectively, upon opposite sides of the bracket 13. The other side of the motor; *i. e.*, the side that is provided with bearings upon the quill 5, is secured to the lower ends of rods 17 that are resiliently suspended from brackets 18 by means of helical compression springs 19 and 20, said springs being interposed, respectively, between the top and bottom faces of the brackets and collars 22 upon the upper ends of the suspension rods. The bearings 10 upon the quill may be relieved, to any desired degree, of the weight of the motor by adjustment of nuts 23 that are threaded upon the upper ends of the suspension rods.

While the invention has been shown and described as applied only in connection with a motor having side bearings upon a quill that surrounds the driving axle, it is as readily applicable and as useful when the quill is dispensed with and the motor is geared directly to, and is provided with bearings, upon the driving axle. I, therefore, desire that the invention be construed broadly enough to cover such an arrangement.

I claim as my invention:

1. The combination with an axle, and a quill surrounding the same, of a motor operatively connected to and provided at one side with bearings upon the quill, and resilient suspension means attached to the side of the motor having said bearings.

2. The combination with an axle, and a quill surrounding the same, of a motor operatively connected to the quill and provided at one side with bearings thereon, and suspension means attached to the side of the motor having said bearings.

3. The combination with an axle, and a quill surrounding the same, of a motor operatively connected to the quill and provided at one side with bearings thereon, and means for relieving the said bearings, to any desired degree, from the weight of the motor.

4. The combination with a motor, and a member driven thereby, of bearings at one side of the motor upon the driven member, and resilient suspension means attached to the side of the motor having said bearings.

5. The combination with a motor, and a member driven thereby, of bearings at one side of the motor upon the driven member, and suspension means attached to the side of the motor having said bearings.

In testimony whereof, I have hereunto subscribed my name this 23rd day of Dec., 1907.

NORMAN W. STORER.

Witnesses:
F. E. WYNNE,
BIRNEY HINES.